United States Patent [19]

Repton et al.

[11] Patent Number: 4,953,211

[45] Date of Patent: Aug. 28, 1990

[54] ENCRYPTION APPARATUS

[75] Inventors: Andrew S. Repton; Martin Lysejko, both of Lincoln

[73] Assignee: Marconi Electronic Devices Limited, England

[21] Appl. No.: 375,575

[22] Filed: Jul. 5, 1989

[30] Foreign Application Priority Data

Jul. 13, 1988 [GB] United Kingdom ................ 8816636

[51] Int. Cl.[5] ............................................ H04L 9/06

[52] U.S. Cl. ........................................ 380/50; 380/9; 380/28; 380/33; 380/35

[58] Field of Search .................. 380/9, 36, 37, 38, 41, 380/42, 50, 49, 28, 33, 35

[56] References Cited

U.S. PATENT DOCUMENTS 4,099,027 7/1978 Whitten ................................ 380/35

4,742,546 5/1988 Nishimura ............................ 380/35

*Primary Examiner*—Stephen C. Buczinski

*Assistant Examiner*—Bernarr Earl Gregory

*Attorney, Agent, or Firm*—Kirschstein, Ottinger, Israel & Schiffmiller

[57] ABSTRACT

Encryption apparatus mainly intended for encrypting speech signals samples a signal to be encrypted at two differing rates, and reads the sampled signal into storage means at one of said rates and reads it out of said storage at the other of said rates so that the signal is alternately dispersed upwardly and downwardly with each pair of upward and downward dispersion representing a frame. To improve security the apparatus further generates a pseudo random binary number, defines a superframe structure consisting of a predetermined number of said frames, and sets the starting point of each individual superframe as an upward or a downward dispersion in dependence on the next digit of said pseudo-random binary number.

6 Claims, 9 Drawing Sheets

Fig. 6. SUPER-FRAME STRUCTURE

ENCRYPTION APPARATUS

BACKGROUND OF THE INVENTION

1. Field of the Invention

The present invention concerns data encryption or scrambling and relates in particular to the encryption of analogue data, such as speech, and the subsequent reconstitution of the scrambled data into its original form. One field where scrambling is of importance is radio as radio signals can be picked up by anyone with a correctly tuned receiver.

2. Description of Related Art

A well known encryption technique employed for speech signals involves sampling and digitising the signal to be scrambled with a delta modulator. The digitised signal is fed into a storage device at one rate and read out of the device at a second, different rate. In effect the original signal is alternately compressed or expanded in time. However this technique alone does not provide a very high level of security. Any receiving device which can reproduce the inverse of the two encryption clock rates will be able to reconstruct the data.

Previously protection from one device to another has been provided by the use of many different clock frequencies. However this solution also causes problems as it is difficult to optimise a delta modulator for a wide range of clock frequencies.

SUMMARY OF THE INVENTION

The present invention proposes an encryption system which avoids the need of having to optimise the delta modulator over a wide range of frequencies yet which provides an enhanced degree of security.

Accordingly the present invention provides encryption apparatus comprising means for sampling a signal to be encrypted at two differing rates, and for reading the sampled signal into storage means at one of said rates and reading it out of said storage means at the other of said rates so that the signal is alternately dispersed upwardly and downwardly, each pair of upward and downward dispersion representing a frame, means for generating a pseudo random binary number, means for defining a superframe structure consisting of a predetermined number of said frames, and means operative to set the starting pont of each individual superframe as an upward or a downward dispersion in dependence on the next digit of said pseudo-random binary number.

BRIEF DESCRIPTION OF THE DRAWINGS

It will be appreciated that the invention also encompasses decryption apparatus for decrypting the encrypted signal and that such apparatus is also included within the scope of the invention. In order that the present invention may be more readily understood an embodiment thereof will now be described by way of example and with reference to the accompanying drawings in which.

DETAILED DESCRIPTION OF THE PREFERRED EMBODIMENTS

Figure 1:
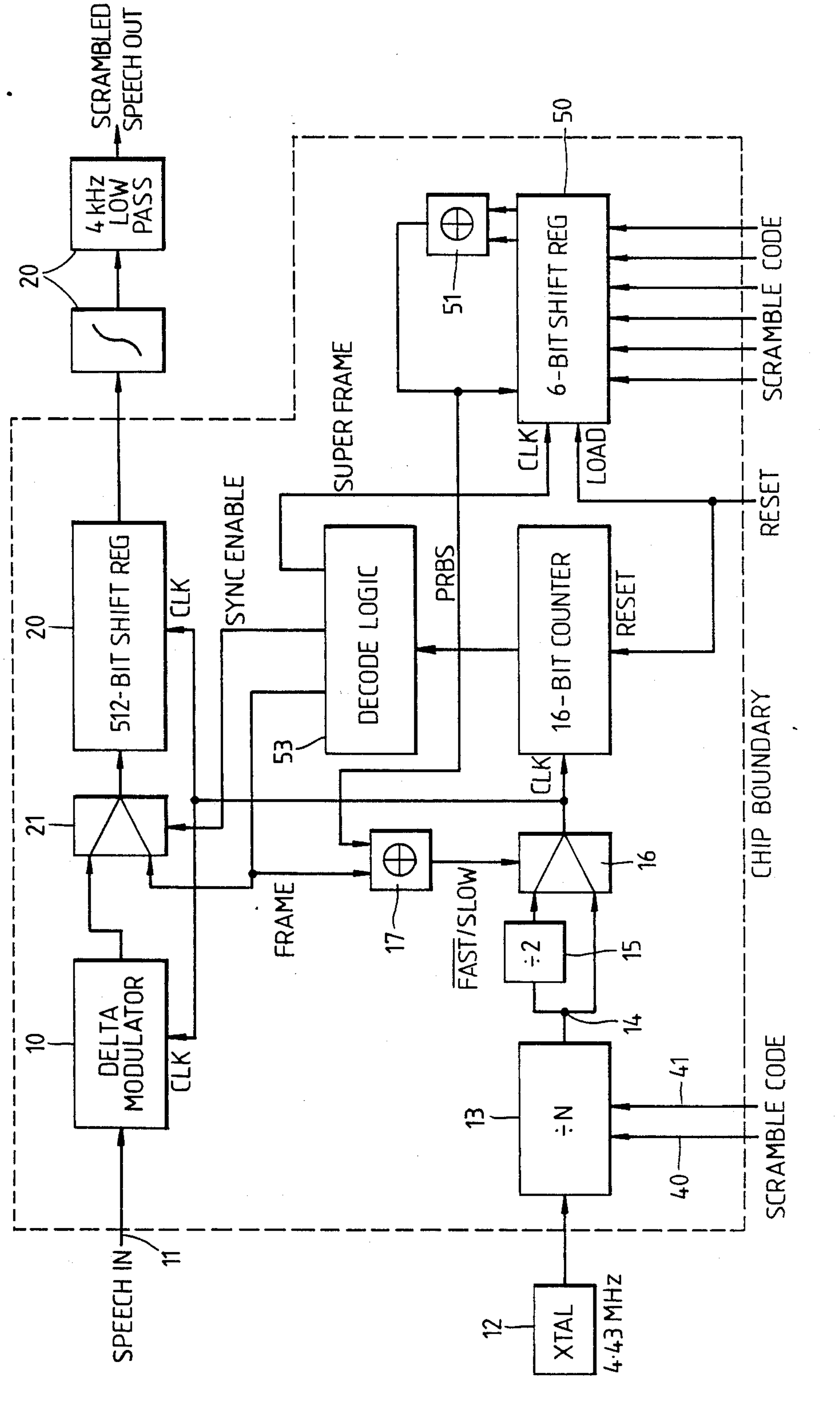
FIG. 1 is a block diagram of a speech encryption apparatus constructed in accordance with the present invention.

Referring now to FIG. 1 of the drawings, this shows speech encryption apparatus comprising a delta modulator 10 for receiving speech to be encrypted. The speech is supplied by an input 11. The delta modulator 10 samples and digitises the incoming speech signal at one of two clock rates, namely a fast clock in the order of 300 KHz or a slow clock which is half the frequency of the fast clock. In the present embodiment a frame period consists of 1536 fast sample clock periods. The clock signal is derived from a 4.43 MHz crystal faster clock 12 and the fast clock is obtained by dividing the master clock by a divide-by-N counter 13 where N is set by a two-bit scramble code. The output of counter 13 is branched at 14 and one of the two branches includes a divide-by- 2 circuit 15 which provides the slow clock. The two branches containing the respective fast and slow clocks are fed to a changeover switch 16 the state of which is controlled by the output of an Exclusive - OR gate 17. In response to gate 17 switch 16 supplies either fast or slow clock pulses to the delta modulator 10 and to a 512-bit shift register 20. The output of delta modulator 10 is fed to shift register via a changeover switch 21. The output of shift register 20 is converted to analogue by the integrator 22 and filtered at 23 for transmission on to the receiver part of the apparatus.

Figure 3:
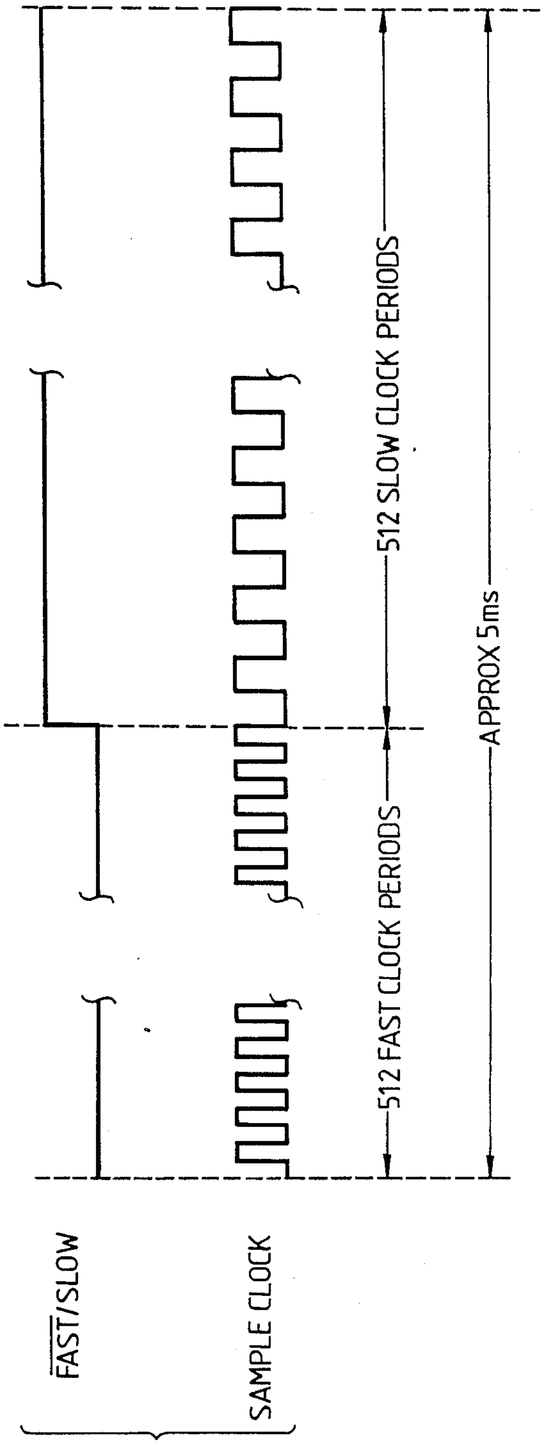
FIG. 3 shows sample clock waveforms used in the operation of the encryption apparatus of FIG. 1.
Figure 4:
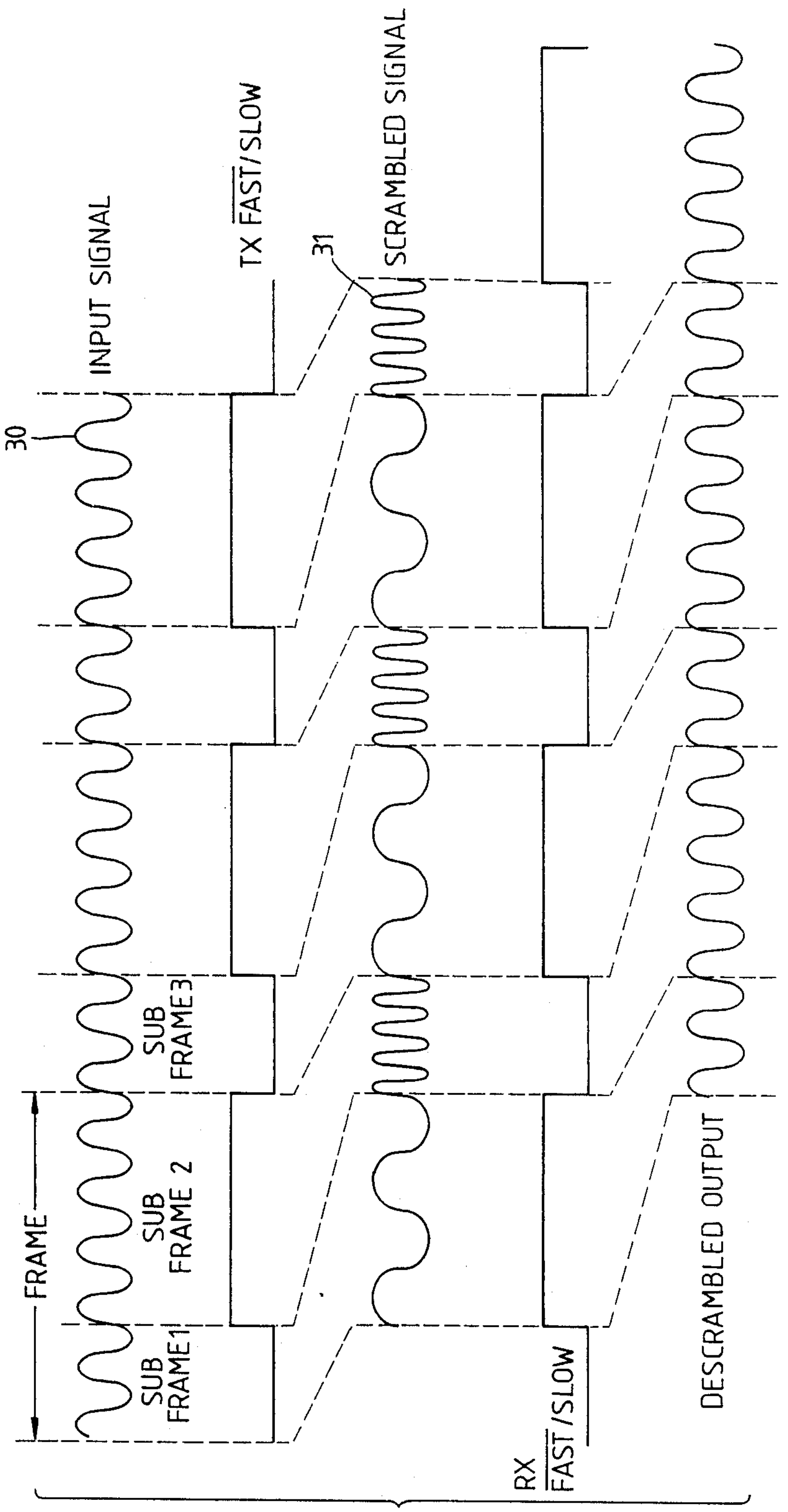
FIG. 4 shows waveforms resulting from the encryption and decryption procedures carried out by the apparatus of FIGS. 1 and 2.

FIG. 3 of the drawings shows a typical sample clock sequence over a single frame made up of a sub frame 1 consisting of 512 fast clock periods followed by a subframe 2 of 512 slow clock periods. FIG. 4 of the drawings shows a speech signal 30 which is to be encrypted by being sampled at the two different clock rates as defined by the subframes 1, 2 and 3. The effect of alternating the clock rate is shown at 31. It can be seen that the incoming signal has effectively been warped in time. The amount of time warping is known as the dispersion and in the embodiment being described the dispersion is +2.0. Thus when the input signal falls into a short subframe (1,3) it is expanded in time by a factor of 2, and when it falls into a long subframe (2) it is coapressed in time by a factor of two. For the purpose of this specification, the expansion of the signal in the short sub-frame is known as downward dispersion, and the compression of the signal in the long sub-frame is known as upward dispersion. A single combination of adjacent long and short sub-frames is defined as a signal frame.

This regular dispersion provides non-decode security which is sufficient to provide security against a casual eavesdropper. The present invention is concerned with providing increased security. In order to do this the embodiment shown in FIG. 1 has two additional features which give an enhanced ability to hamper decoding.

The first feature for enhancing the degree of security is that the embodiment shown in FIG. 1 includes means for pre-setting the length of a frame so that apparatus which is similar but which is set to a different frame length cannot decode the encrypted signal correctly. This is achieved by varying the frame length from one apparatus to another. The frame length is intimately related to the sample clock and in the embodiment being described the sample clock is determined by the divide-by-N counter 13 and N is in turn determined by a two-bit scramble code input at the inputs 40, 41 of counter 13.

As previously mentioned the frame period is 1536 fast sample clock periods and should be between about 3.8 and 5 ms. This constrains the fast sample clock to be between 307.2 KHz and 404.2 KHz which allows the use of 4.43 MHz divided by 11, 12, 13 and 14.

The second method of enhancing decode security is to order the dispersion sequence between down/up and up/down. Each pair of alternate upward and downward dispersion of the signal is known as a frame. Previously once encryption has started upward and downward dispersion would proceed in a regular manner. This means that the encrypted signal can be read by a third party using relatively unsophisticated equipment. Accordingly the present invention proposes that what is referred to as a "super-frame" structure is imposed onto the regular upwards and downwards dispersion of the signal to be encrypted. Thus after a predetermined number of frames the order of the upwards or downwards dispersion is altered in response to a pseudo-random binary sequence. Thus at the start of each superframe the pseudo-random binary number determines whether the first signal dispersion is upwards or downwards independently of the direction of dispersion which occurred in the preceding subframe.

Figure 5:
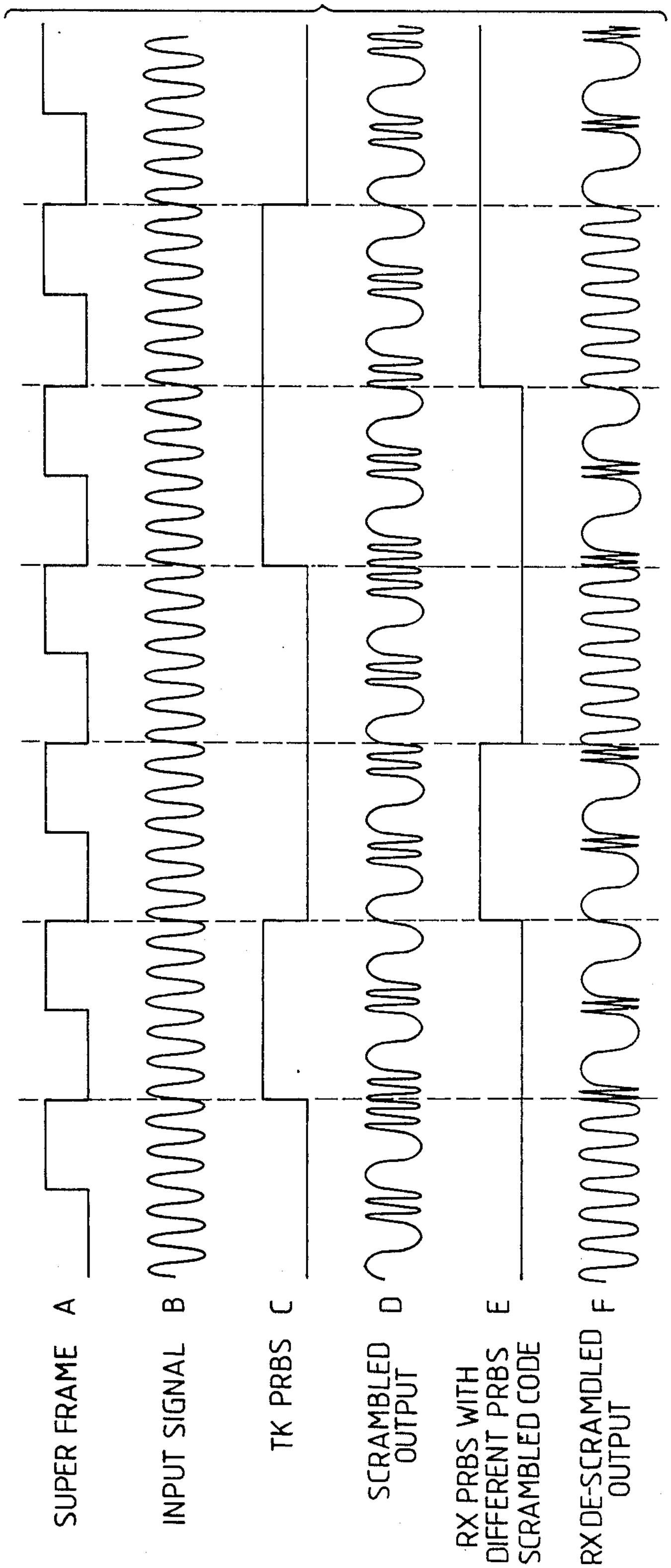
FIG. 5 shows how dispersion can be ordered.

The effect of following this procedure is shown in FIG. 5 of the drawings. In this Figure a superframe is shown at A and an analogue input signal at B. The superframe A is regular and accordingly would result in a scrambled signal of the kind shown in FIG. 4. However the up-down sequence of the regular frame structure is varied by a pseudo-random binary sequence as is shown at C in FIG. 5. The effect of this sequence is shown at D. Should an attempt be made to unscramble the signal D with the wrong super frame sequence, such as the sequence shown at E in FIG. 5, the result is the signal shown at F. This signal would still be unintelligable to any eavesdropper. Thus instead of a regular transition between up and down as shown in FIG. 4, the changes in dispersion are ordered. As the sequence has to be followed by the decryption device the changes are ordered in a pseudo-random manner which repeats after a particular number of super frames.

Figure 6:
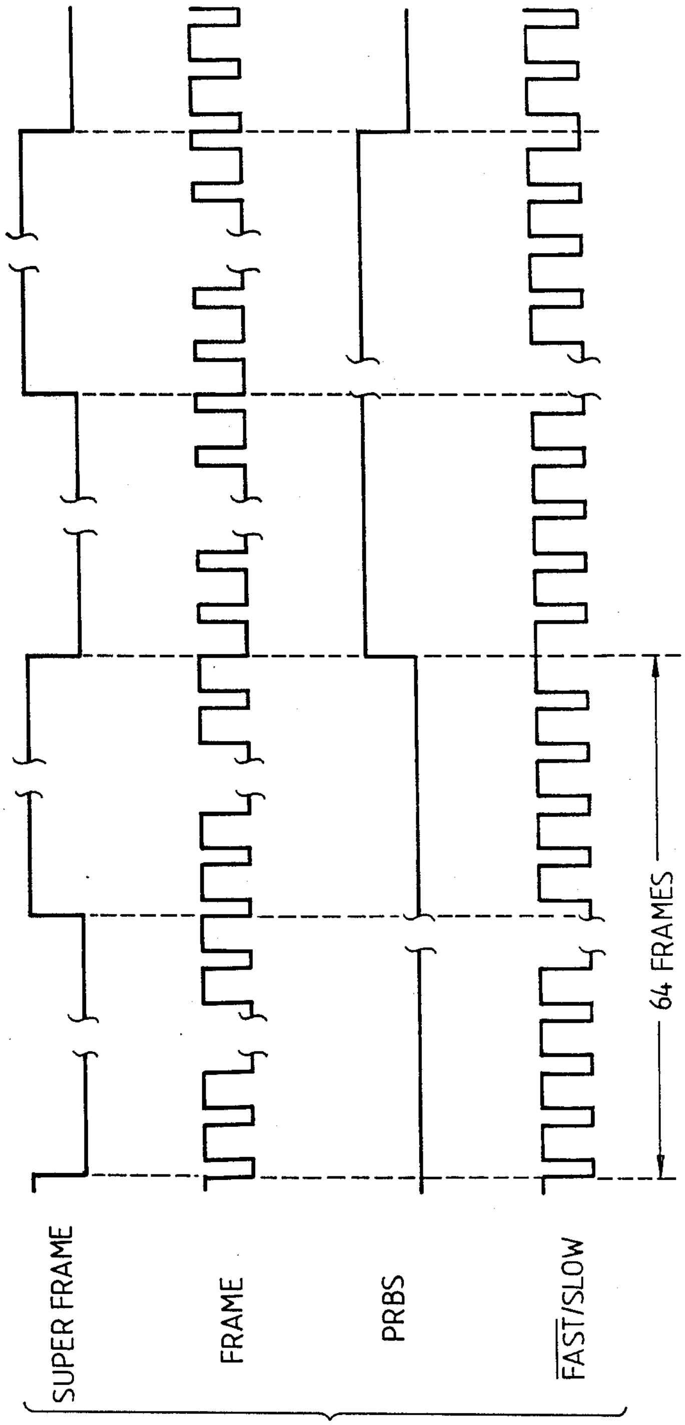
FIG. 6 shows a frame structure.
Figure 7:
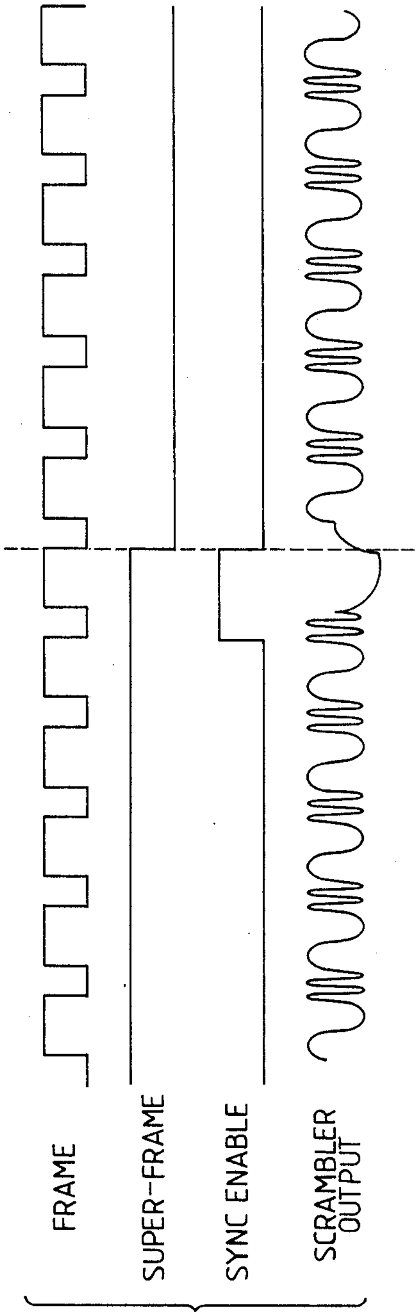
FIG. 7 shows the generation of a synchronising pulse.

FIG. 6 of the accompanying drawings shows the structure of a super frame from which it can be seen that the length of each super frame is 64 ordinary frames. Naturally this figure is given only by way of example and can be varied.

Returning now to FIG. 1 the pseudo random binary sequence is generated by a 6-Bit feed-back shift register 50. The last two stages of register 50 are fed to an exclusive - OR gate 51 and the output of this gate 50 forms the input to the first stage of the register. At the start of an encryption operation a 6-bit scramble code is fed into the register which is thereafter clocked by a clock signal on a line 52. A 6-bit shift register set up in this manner generates a pseudo random binary sequence which is 63 bits long. The 6-bit scramble code supplied to register 50 and the 2-bit scramble code supplied to counter 13 together form an 8-bit code.

The clock signal for the shift register 50 is generated by a logic decode circuit 53. Logic decode circuit 53 is driven by the output of a 16-bit counter 54 which is clocked by the output of changeover switch 16 so that counter 53 counts at the sample rate selected by changeover switch 16. This circuit 53 has three basic functions. Besides providing the clock signal for register 50 it provides a signal to one input of gate 17 to control the frame length, and also provides a control signal to changeover switch 21 so that this switch can be switched from a condition in which it passes the output of delta modulator 10 to shift register 20 to a condition in which a synchronising signal generated by circuit 53 is loaded into register 20. The reason for this is that to encrypt and decrypt the data correctly it is essential that the scrambler pair of transmitting and receiving apparatus are initialised simultaneously and maintain synchronism. Simultaneous initialisaton is required so that the scrambler pair are both in the same state at the same time. It is assumed that the scrambler pair can be initialised by the host environment. Synchronisation is required so that any drift in the master clocks cannot accumulate to levels where the scrambler pair are in significantly different states.

In the present embodiment synchronisation is achieved by deleting a frame of speech for every superframe and inserting a sync pulse. When the receiver apparatus expects to see a sync pulse a window is opened. The receiver apparatus will be described hereinafter. Thus a synchronisation pulse is generated every superframe period and switches the changeover switch so that the output of delta modulator 10 is blanked off and replaced by a frame signal from circuit 53. This frame signal consists of all zeroes for one sub-frame and all ones for the next sub-frame. The result of this is that the scrambled output incorporates a downward then upwardly going ramp with the transition between down and up occurring at the transition between one superframe and the next. The insertion of the sync pulse has the effect of deleting one frame of speech. However the positioning of the sync pulse is such that it deletes speech that would in any case have been corrupted when the superframe changed. This corruption would have occurred because speech would be encrypted by one dispersion order and decrypted by the other. The loss of a single frame can be tolerated by a listener.

Figure 10:
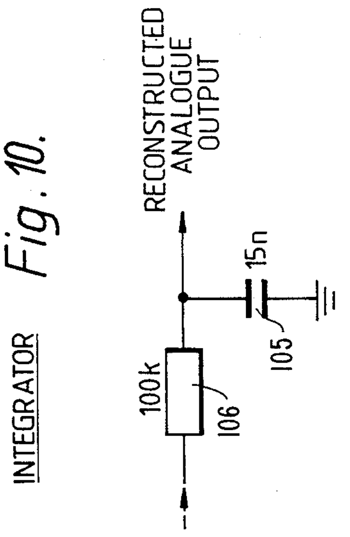
FIG. 10 is a block diagram of an integrator circuit.
Figure 9:
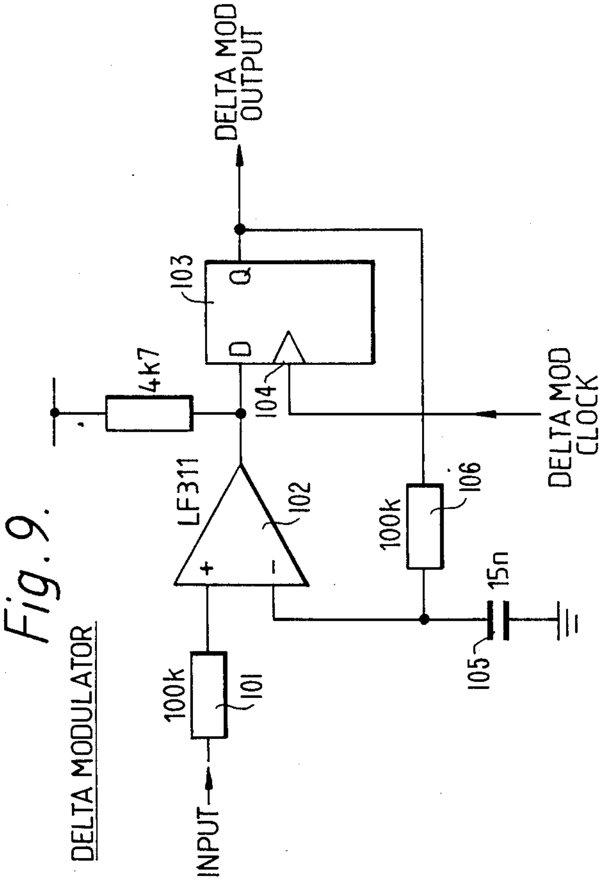
FIG. 9 is a block diagram of one embodiment of delta modulator which can be used in the embodiment of FIG. 1.

The receiver apparatus for descrambling the encrypted signal output by the apparatus of FIG. 1 includes a delta modulator 100 similar to delta modulator 10. A delta modulator of the kind which is common to both circuits is shown in greater detail at FIG. 9. The input signal is supplied via a resistor 101 to the positive input of a comparator 102 the output of which is fed to a D-type flip-flop 103 having a clock input 104. An R.C. network consisting of a capacitor 105 and a resistor 106 is used to approximate an integrator (see FIG. 10). The Q-output of the flip-flop 103 provides the output signal. The delta modulator is capable of coding input signal of 1.0 v peak at 500 Hz with a signal to noise ratio of 50 dBs or better.

Figure 2:
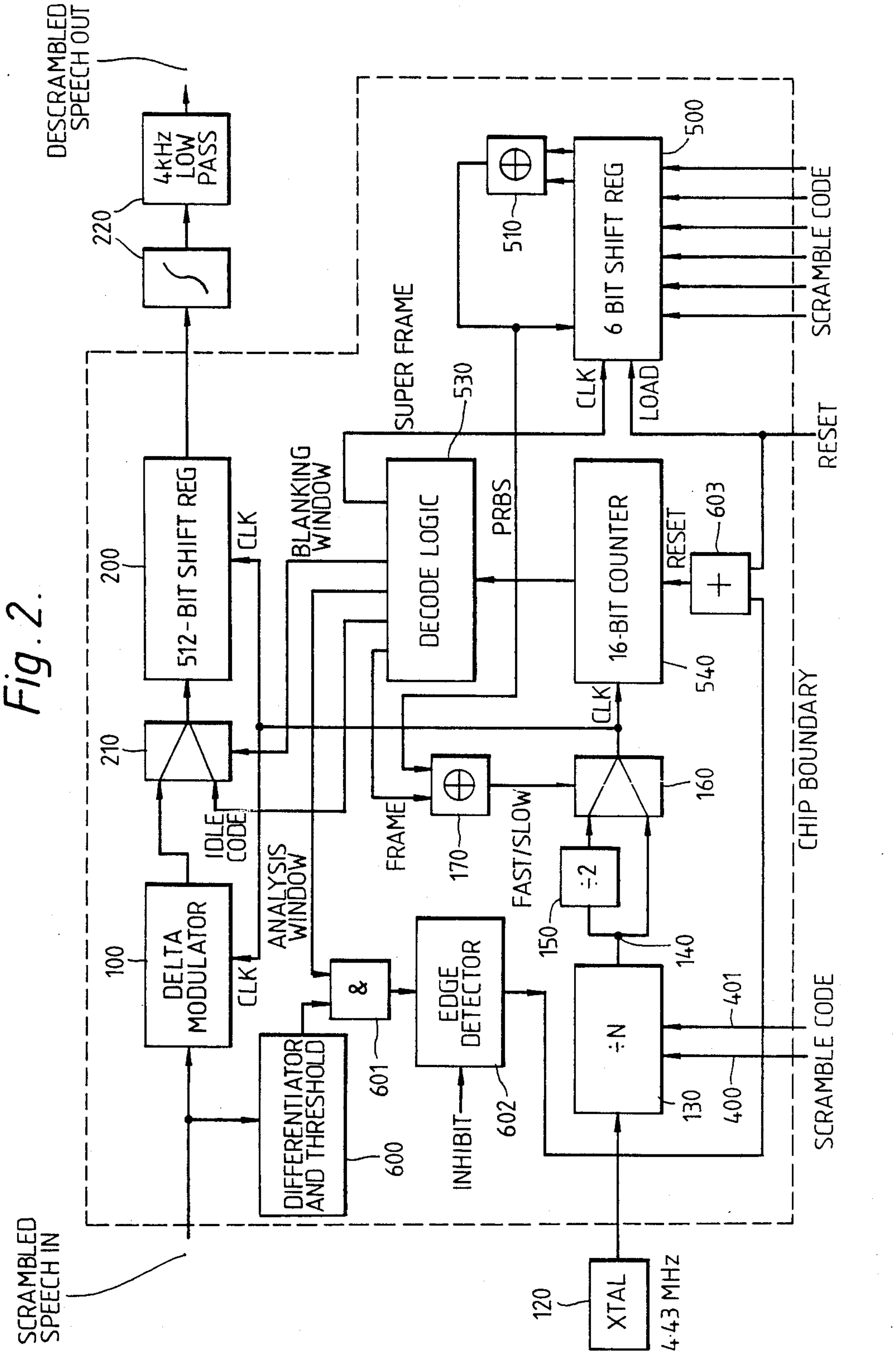
FIG. 2 is a block diagram of decryption apparatus for decrypting signals generated by the apparatus of FIG. 1.

As the decryption apparatus has to provide the converse of the operations performed by the transmit apparatus it will be appreciated that it is largely identical in structure to the encryption apparatus shown in FIG. 1. Thus the decryption apparatus as well as having a delta modulator 100 corresponding to delta modulator 10 has a 512 - bit shift register 200 identical to register 20. In fact as can be seen all components of FIG. 2 which correspond to FIG. 1 have been given reference numerals which vary only by the addition of a zero.

However the receive apparatus has the additional function of having to detect the presence of the sync pulse. Sync pulse detection is initiated one sub-frame before the superframe changes state. A blanking window is generated by logic decode circuit 530 for one sub-frame before and one subframe after the superframe changes state. This blanking window switches change-over switch to blank out the signal from delta modulator 100 to an idle code on line from circuit 530. This idle code is a sequence of alternate ones and zeros which effectively hold steady the circuits which reconstruct the encrypted signal. The circuit 530 also opens out an analysis window for half a subframe before and half a subframe after the superframe has changed state. It will be appreciated that the superframe itself is generated in a manner identical to that described with reference to FIG. 1. Thus a pseudo random binary sequence is generated by a feed back shift register 500 clocked by decode logic circuit 530 and seeded with the same 6-bit scramble code as shift register 50. The analysis window is shown in FIG. 8 and is derived from the counter output which runs at twice the rate of the frame output.

The analysis window is used to enable the circuitry which looks for the sync pulse and is sized so as to allow for the effects of drift.

Figure 11:
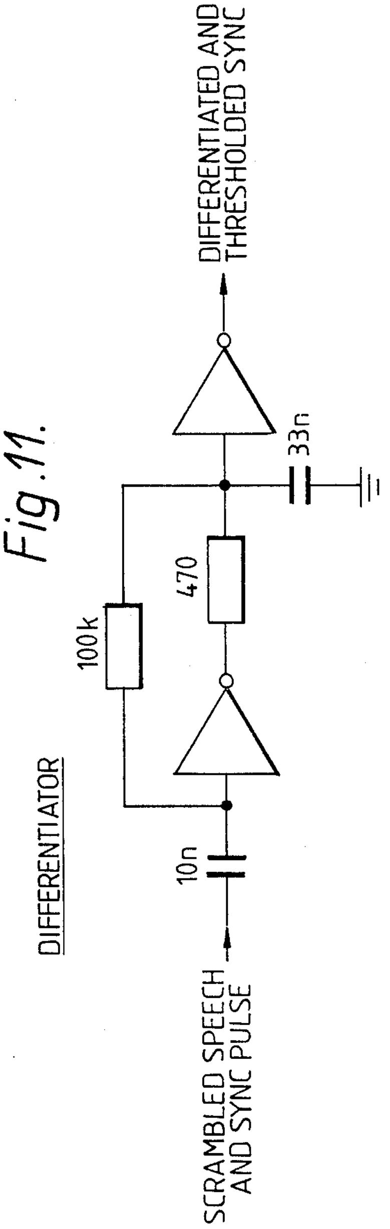
FIG. 11 is a block diagram of a differentiator circuit.

In operation the input signal to be decrypted is also fed to a differentiator 600 (see FIG. 11) where it is both differentiated and thresholded. The output of differentiator 600 is taken to an AND-gate 601 the other input of which is supplied by the analysis window signal from decode logic circuit 530. Thus gate 601 is only open during the analysis window. The output of gate 601 is taken to an edge detector circuit 602 which on detection of the sync pulse gives a signal to an AND-gate 603 the output of which resets counter 540 when the detection of a sync pulse is coincident with a RESET signal on line 550, the reset signal also loading the scramble code into shift register 500 so as to restart the superframe sequence. An inhibit signal is supplied to the edge detector circuit to stop it looking for a sync pulse immediately after initialisation.

Figure 8:
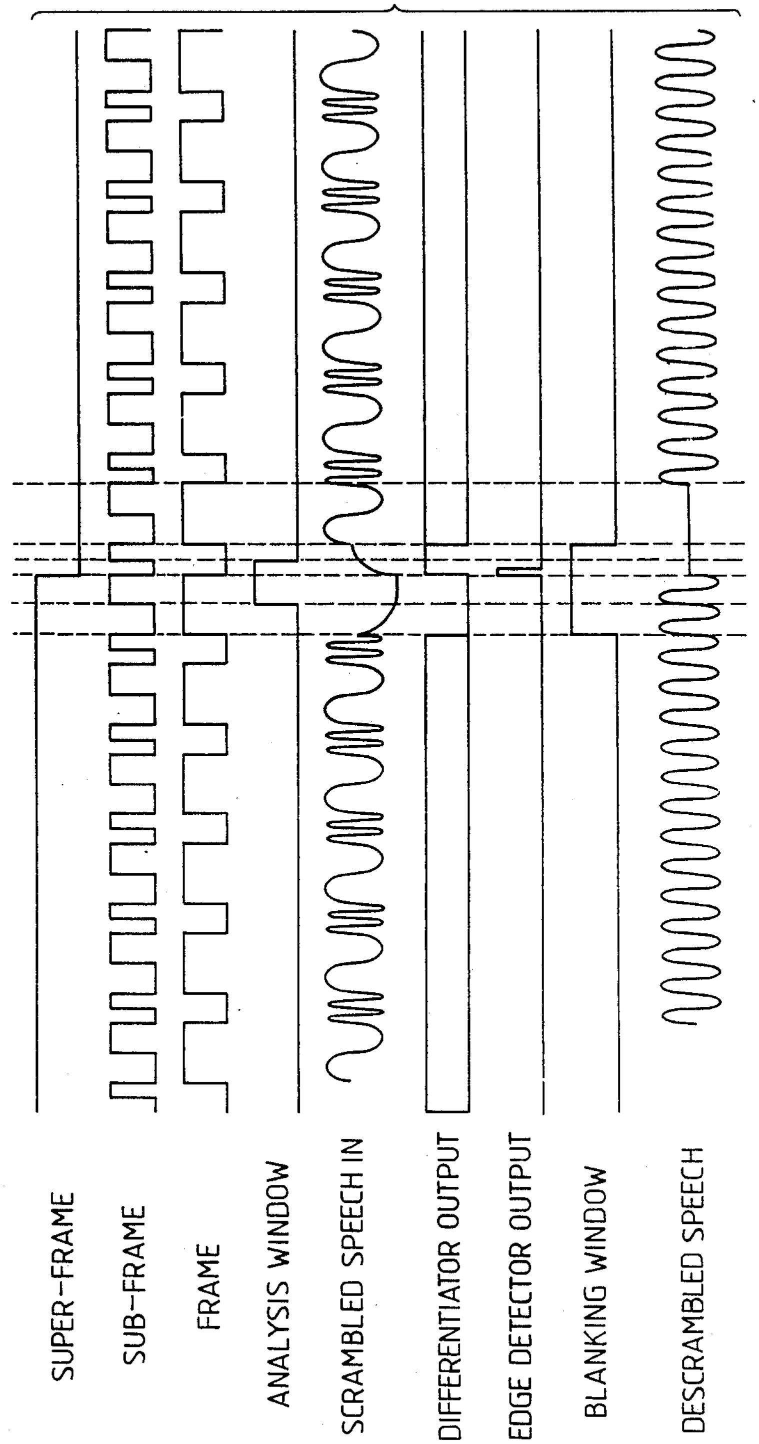
FIG. 8 shows waveforms resulting from the operation of the apparatus of FIGS. 1 and 2.

Various signals utilised during sync pulse detection are shown in FIG. 8 of the accompanying drawings. As can be seen a part of the descrambled speech has been blocked out.

In the foregoing description the registers 20 and 200 have been described as 512-bit registers. This length is advantageous because it allows a 5 ms. frame and makes control signals easy to generate from a 16-bit counter. However since the delta modulators 10, 100 each incorporate a D-type flip flop each should be considered as part of the associated shift register. Thus with a 510-bit shift register plus the delta modulator the Fast/Slow signal should be low for 511 fast sample clocks and high for 511 slow sample clocks.

From the preceding description it will be seen that independent operation of the transmit and receive functions requires duplication of much circuitry. However it is possible that some functions may be commoned such as the master clock and divide-by-N counter.

We claim:

1. Encryption apparatus, comprising:

(a) means for sampling a signal to be encrypted at two differing rates, and for reading the sampled signal into storage means at one of said rates and reading it out of said storage means at the other of said rates, said sampled signal being expanded in time in a downward dispersion, and being alternately compressed in time in an upward dispersion, each pair of upward and downward dispersions occurring in frames;

(b) means for generating a pseudo-random binary number;

(c) means for defining a superframe structure consisting of a predetermined number of said frames; and (d) means operative for setting a starting point of each individual superframe as one of said upward and downward dispersions in dependence on a digit of said pseudo-random binary number.

2. Apparatus as claimed in claim 1, wherein means are provided for altering the length of each said frame.

3. Apparatus as claimed in claim 2, and comprising a divide-by-N counter for generating a sample clock, and means for setting N to determine the length of a frame.

4. Apparatus as claimed in claim 3, wherein said means for generating the pseudo random binary number comprise a shift register containing a scramble code, means for clocking the shift register, and an exclusive-OR Gate to which the last two stages of the shift register are connected and the output of which is connected to the input of said shift register.

5. Apparatus as claimed in claim 1, and further including synchronization means for providing synchronization of the transmitted encrypted signal, the synchronization means comprising means for deleting a frame of the encrypted signal in every superframe, and means for inserting a sync pulse into a deleted frame.

6. Apparatus as claimed in claim 5, wherein said means for generating the pseudo-random binary number comprise a shift register containing a scramble code, means for clocking the shift register, and an exclusive-OR Gate to which the last two stages of the shift register are connected and the output of which is connected to the input of said shift register.

* * * * *